US011457407B2

(12) United States Patent
Zhou et al.

(10) Patent No.: US 11,457,407 B2
(45) Date of Patent: Sep. 27, 2022

(54) RELIABLE MULTICAST/BROADCAST TRANSMISSION SCHEME

(71) Applicant: Hewlett Packard Enterprise Development LP, Houston, TX (US)

(72) Inventors: Qiang Zhou, Beijing (CN); Jianpo Han, Beijing (CN); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 54 days.

(21) Appl. No.: 16/547,183

(22) Filed: Aug. 21, 2019

(65) Prior Publication Data
US 2021/0058861 A1 Feb. 25, 2021

(51) Int. Cl.
*H04W 52/02* (2009.01)
*H04L 12/18* (2006.01)
*H04W 72/00* (2009.01)

(52) U.S. Cl.
CPC ..... *H04W 52/0216* (2013.01); *H04L 12/1868* (2013.01); *H04L 12/1881* (2013.01); *H04W 72/005* (2013.01)

(58) Field of Classification Search
None
See application file for complete search history.

(56) References Cited

U.S. PATENT DOCUMENTS

| 7,593,417 | B2 | 9/2009 | Wang et al. |
| 8,005,515 | B1 | 8/2011 | Chhabra et al. |
| 8,411,608 | B2 | 4/2013 | Moscibroda et al. |
| 9,716,985 | B2 | 7/2017 | Hsieh |
| 2013/0114583 | A1* | 5/2013 | Park ................. H04W 52/0216 370/338 |
| 2016/0309410 | A1* | 10/2016 | Bhanage .......... H04W 52/0209 |

(Continued)

FOREIGN PATENT DOCUMENTS

WO WO-2018132668 7/2018

OTHER PUBLICATIONS

Chandra, R. et al., DirCast: a Practical and Efficient Wi-Fi Multicast System, (Research Paper), Proceedings of the 2009 17th IEEE International Conference on Network Protocols Oct. 13-16, 2009 10pgs.

(Continued)

*Primary Examiner* — Basil Ma
(74) *Attorney, Agent, or Firm* — Jaffery Watson Mendonsa & Hamilton

(57) ABSTRACT

In one example a computer implemented method comprises receiving, at an access point of a wireless network, a multicast/broadcast frame which identifies one or more stations associated with the access point as a recipient for the multicast/broadcast frame, and in response to a determination that at least one station of the one or more stations identified as a recipient for the multicast/broadcast frame is in an inactive state, determining a beacon slot time for a transmission of the multicast/broadcast frame from the access point, in response to a determination that at least one of the one or more stations in an inactive state will miss the beacon signal, converting the multicast/broadcast frame to a unicast frame, and holding a copy of the unicast frame to be transmitted to the at least one of the one or more stations in an inactive state that will miss the beacon signal.

18 Claims, 8 Drawing Sheets

(56) References Cited

U.S. PATENT DOCUMENTS

| | | |
|---|---|---|
| 2018/0115950 A1 | 4/2018 | Asterjadhi et al. |
| 2019/0141631 A1* | 5/2019 | Patil .................. H04W 52/0229 |
| 2019/0200295 A1* | 6/2019 | Hartman ........... H04W 52/0235 |
| 2020/0045634 A1* | 2/2020 | Kneckt ............. H04W 52/0229 |

OTHER PUBLICATIONS

Daldoul, Y., Reliable Multicast Transport of the Video Over the WiFi Network, (Research Paper), Dec. 16, 2013, 151 Pgs.

* cited by examiner

```
For (N =0 ; STAWAKE(N)≤BCMCSlot ; N++)
{
If (ReceiveDTIMs) {
If (nextTBTT(CurTime)≤ STAWAKE(N)) ) {
//case 1.
exit;
}
} else {
If (STAWAKE(N)== BCMCSlot ) {
//case 2.
exit;
}
}
}
// run to here, case 3. Do M2U transformation, and
buffer this frame for this client
m2u_and_hold();
```

FIG. 4

RELIABLE MULTICAST/BROADCAST TRANSMISSION SCHEME

BACKGROUND

Subject matter described herein relates generally to the field of electronic communication and more particularly to electronic communication networks.

Some wireless networking protocols allow client devices to negotiate a sleep time during which the client device enters a low-power state. In some instances, a client device which has entered a low-power state may miss beacons associated with a multicast/broadcast transmission.

Accordingly, techniques to implement a reliable multicast/broadcast transmission scheme may find utility.

BRIEF DESCRIPTION OF THE DRAWINGS

Embodiments described here are illustrated by way of example, and not by way of limitation, in the figures of the accompanying drawings in which like reference numerals refer to similar elements.

FIG. 4 presents pseudocode to implement various operations depicted in FIG. 3.

DETAILED DESCRIPTION

Figure 1:
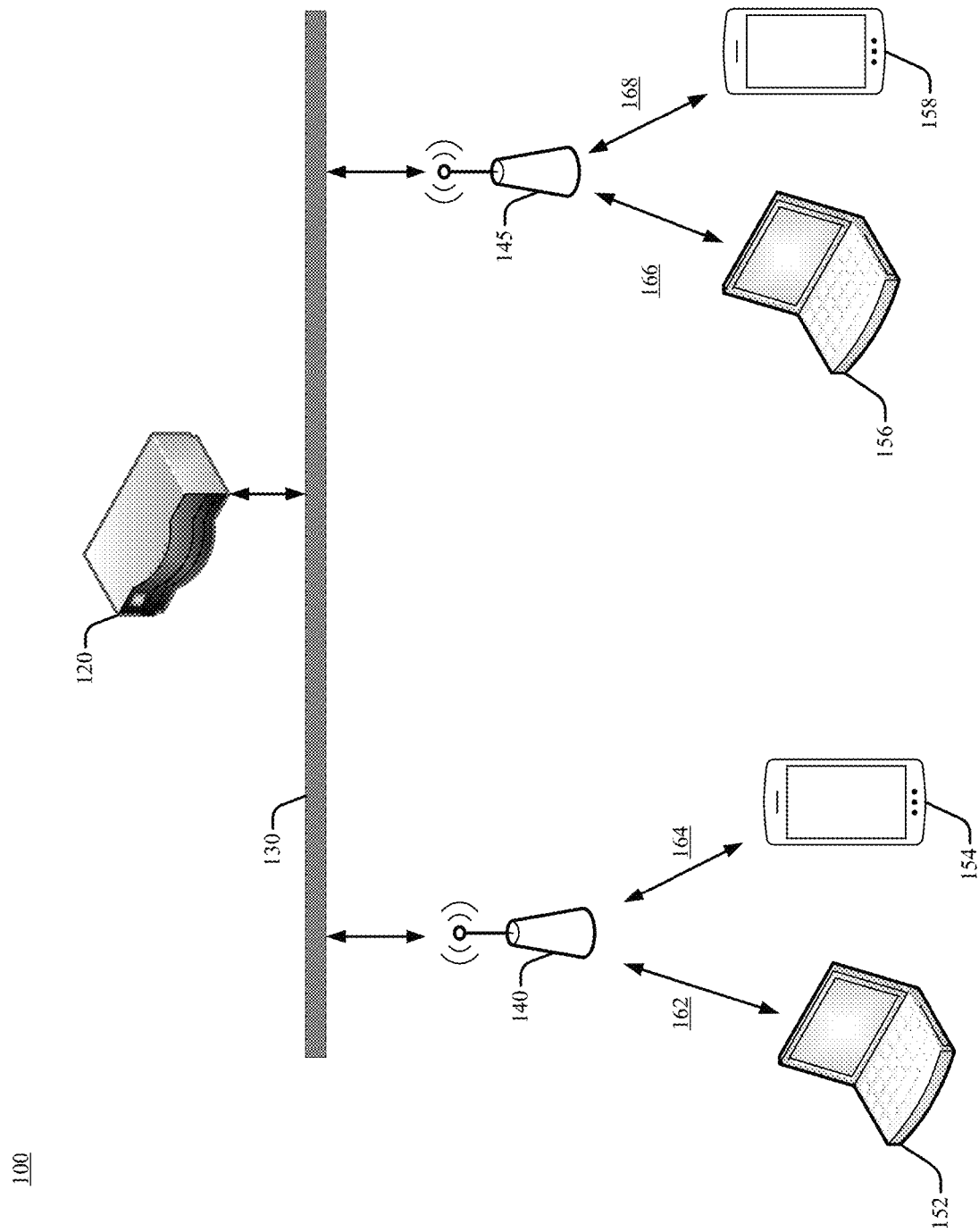
FIG. 1 is a schematic illustration of a wireless networking environment in accordance with some embodiments.

Described herein are exemplary systems and methods to implement a reliable multicast/broadcast transmission scheme in a wireless network. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

Wireless communication networks may be deployed to provide various types of communication to multiple users propagated via electromagnetic waves. As a result, various types of communication may be implemented by and between multiple users without the use of cables, wires, or other physical electric conductors to couple devices in the wireless network. Examples of the various types of communication that may be provided by wireless networks include voice communication, data communication, multimedia services, etc.

An example of a wireless communication network is a wireless local area network (WLAN). As used herein, the term "wireless local area network (WLAN)" can, for example, refer to a communication network that provides a communication link between two or more devices within a coverage area. WLANs such as those defined in the IEEE wireless communication standards, e.g., IEEE 802.11a, IEEE 802.11n, IEEE 802.11ac, 802.11ax can use various wireless encoding techniques, for example, spread spectrum, orthogonal frequency division multiplexing (OFDM), a single-in-single-out (SISO), and/or a multiple-in-multiple-out (MIMO) communication techniques to encode a signal which is then transmitted by a radio transmitter.

Wireless networks typically provide a communication connection to a network via one or more access points (APs), thereby providing users with the mobility to move within a local coverage area while remaining connected to the network. WLANs may include multiple stations, controllers (e.g., WLAN controller(s)), and/or access points that may communicate over one or more wireless channels.

As used herein, an access point (AP) can be a networking hardware device that allows a wireless-compliant device (e.g., a station) to connect to a network, while a controller may perform configuration operations and/or authentication operations on access points and/or station. An access point can refer to receiving points for any known or convenient wireless access technology which may later become known. Specifically, the term access point is not intended to be limited to IEEE 802.11-based access points.

As used herein, a station can be a device that has the capability to use the Institute of Electrical and Electronics Engineers (IEEE) 802.11 protocol. Examples of stations include smart phones, laptops, physical non-virtualized computing devices, personal digital assistants, etc. In some examples, a station may be a device that contains an IEEE 802.11-conformant media access control (MAC) and physical layer (PHY) interface to a wireless medium (WM). As used herein, an access point (AP) can refer to receiving points for any known or convenient wireless access technology which may later become known. Specifically, the term AP is not intended to be limited to IEEE 802.11-based APs.

As used herein, a network device can include a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. The network device may be adapted with circuitry to support wireless connectivity with other network devices being part of a wireless network.

FIG. 1 is a schematic illustration of a wireless communication environment in accordance with some embodiments. Referring to FIG. 1, in some examples a wireless networking environment includes a wireless local area network (WLAN) 100, and optionally a network controller 120, which are coupled to other network devices such as access point 140 and access point 145 via wired network 130. Also, access point 140 can be coupled to one or more client devices 152 and 154 via wireless communication links 162 and 164 respectively. Likewise, access point 145 can be coupled to one or more client devices 156 and 158 via wireless communication links 166 and 168 respectively.

Access points 140 and 145 are hardware units that act as communication nodes by linking wireless mobile stations, such as personal computers, to a wired backbone network. Access point 140 or 145 may connect client devices or users to other client devices or users in the network. Also, access point 140 or 145 may serve as a point of connection between WLAN 100 and wired network 130.

Access point 140 or 145 may generally broadcast a service set identifier (SSID). In particular, access point 140 or 145 may be quality of service (QoS) enhanced access points that are capable of broadcasting QoS basic service set (QBSS). Specifically, additional information, such as QBSS parameters, may be added to the beacon frames or probe requests/response to advertise channel load information. Such additional information allows access points 140 and/or 145 to deckle whether to accept an admission control request. The additional information also allows wireless devices 152-158 to decide which of the available access points 140 and 145 they should choose to associate with.

Access point 140 or 145 may have one or more radios. The radios may be configured to communicate with various wireless devices is wireless links 162-168, which support wireless communication standards. In particular, the radios may include multiple antennas to support Institute of Electrical and Electronics Engineers (IEEE) 802.11 wireless networking standards, Worldwide Interoperability for Microwave Access standards (WiMAX), 4th Generation cellular wireless standards (4G), 3rd Generation Partnership Project Long Term Evolution (3GPP LTE), and Evolved High-Speed Packet Access (HSPA+).

In some embodiments, access point 140 or 145 performs media access control (MAC) processing functions. In some embodiments, controller 120 performs some MAC processing functions. In some embodiments, the MAC processing functions are split between access points 140 and/or 145 and controller 120. The MAC processing functions include, for example, terminating the wireless transmission data and management protocols, translating data between the wired and wireless portions of the network, maintaining statistical information regarding wireless clients and the radio environment, and so on.

Stations (also referred to as wireless clients) 152-158 may be any computing device that includes a network communication interlace, which is capable of wireless communications. For example, stations 152-158 can be, but are not limited to, smart mobile phone, laptop or tablet computing device, personal desktop or workstation, etc.

Wired network 130 generally include any type of network which involves transmission of data over a wire-based communication technology, for example, Ethernet, fiber-optic communication networks, cable networks, telephone networks, electromagnetic networks, etc.

Network controller 120 can be any hardware or software module or any combination thereof, which provides one or more of such functionalities as network configuration, network performance monitoring, network security, network fault management, network accounting management, etc. Note that, although only one controller is depicted in FIG. 1, a network in accordance with the present disclosure may include multiple controllers which collaboratively manage a plurality of network devices such as access points. Moreover, when a network includes multiple controllers, one controller may be elected or selected as a master controller to manage other controllers. Also, note that controller 120 can be a virtual controller, which operates on one or more access points in a wireless network. The virtual controller may be elected among the one or more access points or configured by a network administrator.

As described above, some wireless networking protocols allow client devices to negotiate a sleep time during which the client device enters a low-power state. For example, the IEEE 802.11ax protocol, also referred to as Wi-Fi 6, includes a power management protocol referred to as Target Wake Time (TWT), which enables an access point to define a time or set of times for individual stations to access the communication network. The use of TWT is negotiated between an access point and a station. Target Wake Time reduces network energy consumption by allowing stations to enter a low-power sleep state until their TWT arrives.

The introduction of TWT into a wireless network can create reliability issues with multicast/broadcast transmission schemes. In many instances, an access point utilizes a Delivery Traffic Indication Map (DTIM) to inform stations connected to the access point that multicast/broadcast data is buffered on the access point. The DTIM is broadcast within a periodic beacon and includes a parameter that specifies how frequently a beacon frame includes a DTIM. After transmitting a beacon frame that includes a DTIM, an access point will release the multicast/broadcast data buffered at the access point.

In some instances, a station which has entered a low-power state may miss one or more beacons associated with a multicast/broadcast transmission, which may cause the station to miss the multicast broadcast transmission. To address this issue, subject matter described herein enables a controller associated with an access point to detect a multicast/broadcast frame buffered for transmission from the access point and determine a beacon slot time for a transmission of the multicast/broadcast frame from the access point. Once the beacon time slot is determined the controller may evaluate the TWT data for the stations connected to the access to determine whether one or more stations communicatively coupled to the access point will miss the multicast/broadcast frame. In response to a determination that at least one of the one or more stations will miss the beacon signal, the controller can convert the multicast/broadcast frame to a unicast frame and hold a copy of the unicast frame to be transmitted to the at least one of the one or more stations in an inactive state that will miss the beacon signal.

Operational details will be described in greater detail with reference to FIG. 2A and FIG. 3. FIG. 2 is a flow diagram of a method to implement a reliable multicast/broadcast transmission scheme in accordance with an embodiment. In some examples the operations depicted in FIG. 2 may be implemented by a controller in an access point such as access point 140 or 145 depicted in FIG. 1. In other examples the operations depicted in FIG. 2 may be implemented by a network controller such as network controller 120 depicted in FIG. 1. FIG. 3 is a schematic illustration of a timing diagram of a communication network which may be adapted to implement a reliable multicast/broadcast transmission scheme in accordance with some embodiments.

Figure 2A:
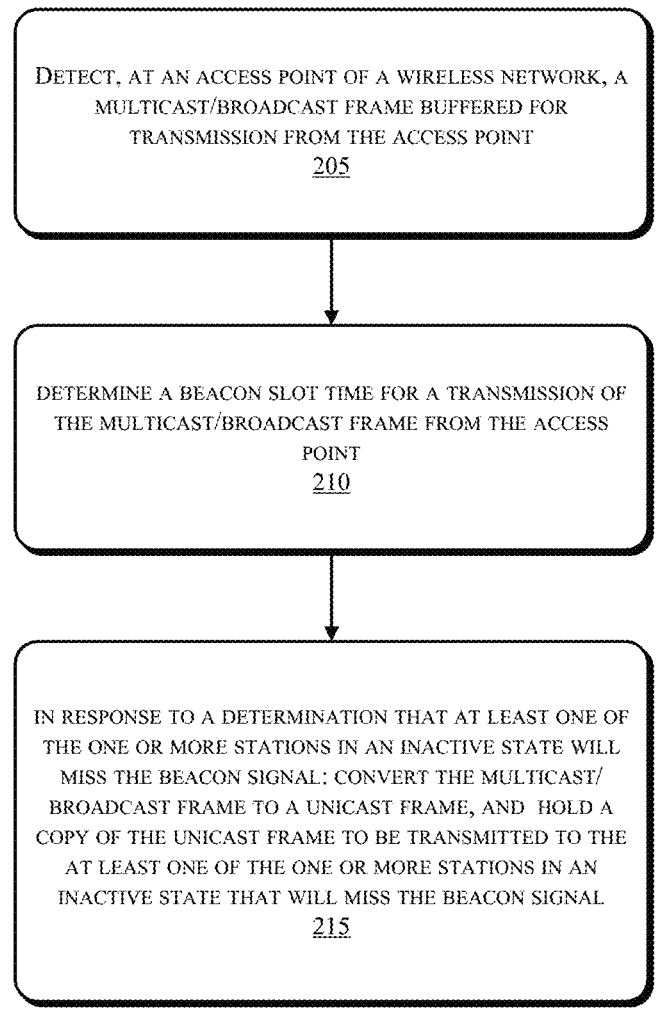
FIG. 2A is a high-level flow diagram of a method to implement a reliable multicast/broadcast transmission scheme in accordance with an embodiment.
Figure 3:
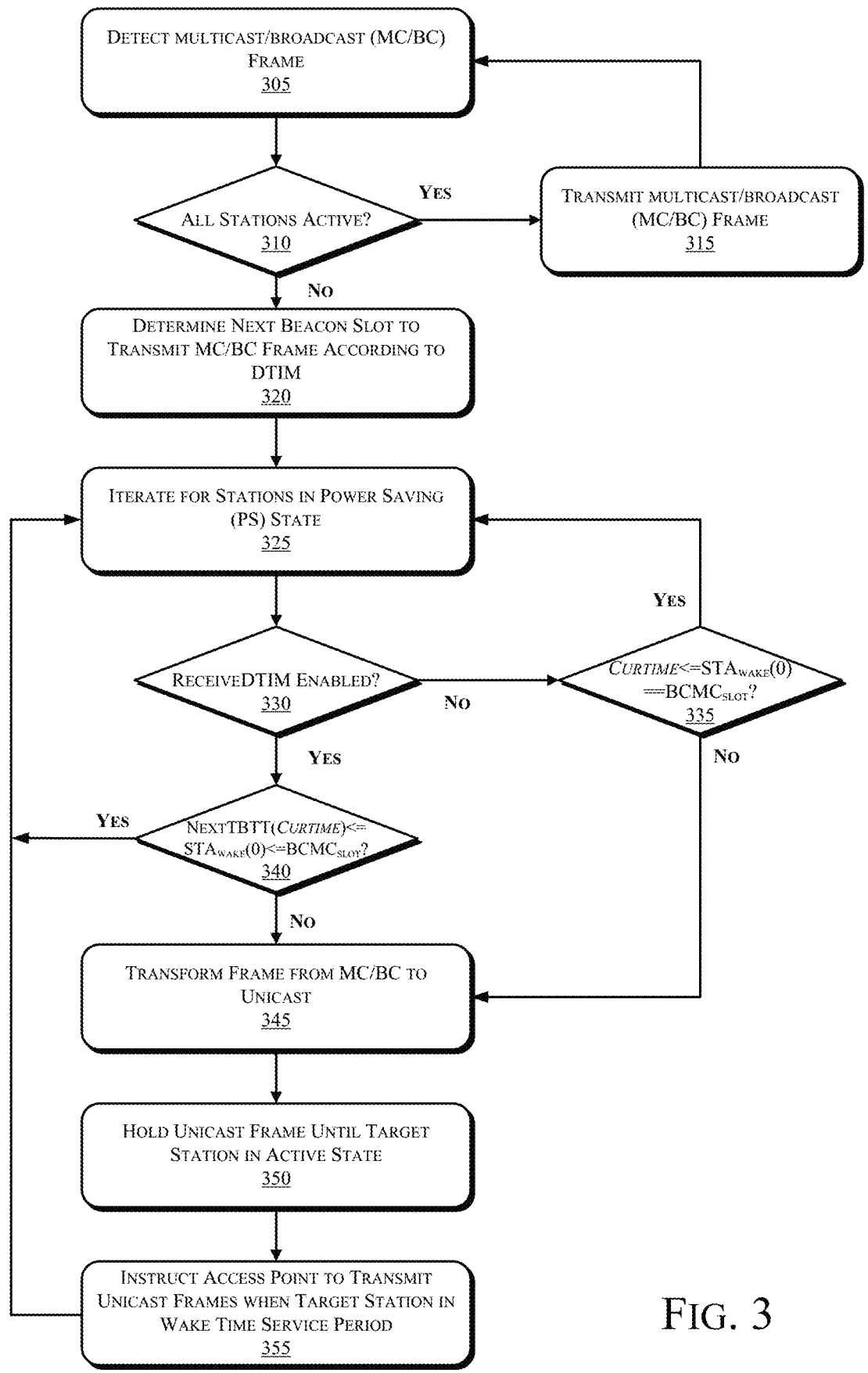
FIG. 3 is a flow diagram of a method to implement a reliable multicast/broadcast transmission scheme in accordance with an embodiment.

Referring to FIG. 2A, at operation 205 the controller detects, at an access point of a wireless network, a multicast/broadcast frame buffered for transmission from the access point. At operation 210 the controller determines a beacon slot time for a transmission of the multicast/broadcast frame from the access point. At operation 215, in response to a determination that at least one or more stations in an inactive state will miss the beacon signal the controller converts the multicast/broadcast frame to a unicast frame and holds a copy of the unicast frame to be transmitted to the at least one of the one or more stations in an inactive state that will miss the beacon signal. Aspects of the method are described in greater detail with reference to the operations depicted in FIG. 3 and the timing diagram 500 depicted in FIG. 5.

Figure 5:
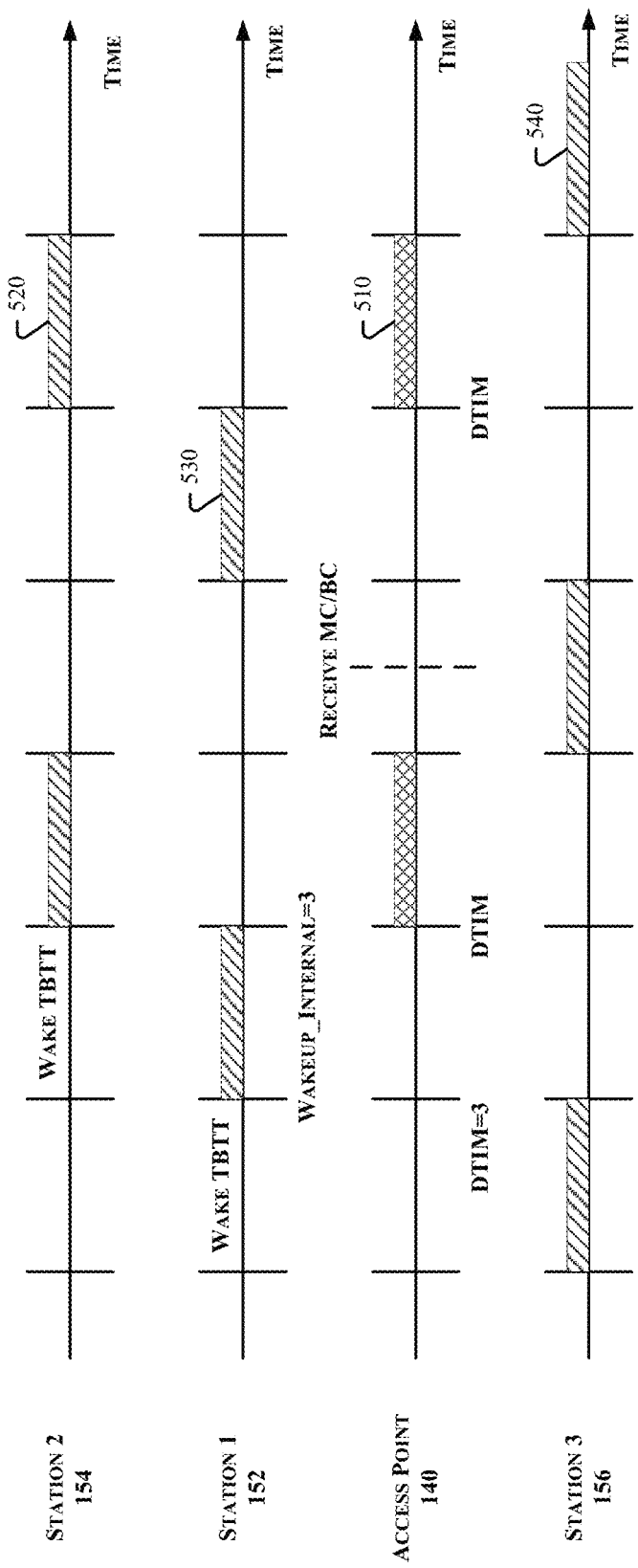
FIG. 5 is a schematic illustration of a timing diagram of a communication network which may be adapted to implement a reliable multicast/broadcast transmission scheme in accordance with some embodiments.

Referring to FIG. 3 and FIG. 5, at operation 305 the controller detects a multicast/broadcast frame at an access point. For example, the controller may detect that a multicast/broadcast frame is buffered in a memory in the access point for transmission from the access point. Alternatively, the controller may detect receipt of a multicast/broadcast frame from a remote network.

At operation 310 the controller determines whether all the stations communicatively coupled to the access point are in an active state. If all the stations are in an active state then control passes to operation 315 and the access point transmits the multicast/broadcast frame in accordance with normal multicast/broadcast protocols.

By contrast, if at operation 310 not all stations communicatively coupled to the access point are in an active state then control passes to operation 320 and the controller determines the next beacon time slot with which the multicast/broadcast frame can be transmitted according to the DTIM. For example, when a multicast/broadcast frame is received, if the left DTIM count is $n_{ditm}$ and the time is CurTime, then the beacon slot in which the buffered multicast/broadcast frame is to be transmitted can be calculated by equation 1:

$$BCMC_{slot} = nextTBTT(CurTime) + (n_{ditm}-1)*BI \qquad EQ1:$$

In equation 1, nextTBTT(CurTime) represents the next beacon's target beacon transmission time (TBTT), BI represents the beacon interval, and $BCMC_{slot}$ represents the beacon slot in which the buffered multicast/broadcast frame is to be transmitted.

A TWT enabled station that is capable to operate in a power saving mode may negotiate with an access point to obtain a wake TBTT for a first beacon frame and a wake interval between subsequent beacon frames. The access point may store these parameters in association with an identifier for the station in a suitable computer-readable memory. Once the negotiation is complete, the station may transition to a lower-power state until its timing synchronization function (TSF) matches the next negotiated wake TBTT. The stations wake up slot can be calculate using equation 2:

$$STA_{WAKE}(N) = wakefirstTBTT + N*(WI*BI) \qquad EQ2:$$

In equation 2, $STA_{WAKE}(N)$ represents the Nth wakeup slot for the station, wakefirstTBTT represents the first wake up TBTT, WI represents the negotiated wakeup interval, BI represents the beacon interval, and N is a variable that can range between zero and infinity.

At operation 325 the controller initiates a process to iterate through each of the stations communicatively coupled to the access point to determine whether the stations are likely to miss the multicast/broadcast frame when it is transmitted from the access point. For a given station, if there is an overlap between a wakeup slot for a station (i.e., $STA_{WAKE}(N)$ in EQ 2) and the beacon slot in which the buffered multicast/broadcast frame is to be transmitted (i.e., $BCMC_{slot}$ in EQ1) then the station should be in an active state during the transmission of the multicast/broadcast frame and thus should be able to receive the multicast/broadcast frame transmitted per the DTIM. Thus, the flow depicted in operations 330-350 may be repeated for each station communicatively coupled to the access point.

At operation 330 the controller determines whether a station is a ReceiveDTIMs enabled station. If, at operation 330, the station is not a ReceiveDTIMs enabled station then control passes to operation 335 and the controller determines whether the station can wake up within the next beacon slot in which the buffered multicast/broadcast frame is to be transmitted (i.e., if CurTime<=$STA_{WAKE}(N)$==$BCMC_{slot}$).

If, at operation 335, the controller determines that the station can wake up within the next beacon slot in which the buffered multicast/broadcast frame is to be transmitted, and therefore the station will be able to receive the multicast/broadcast frame, control passes back to operation 325 and the iteration continues with the next station. By contrast, if at operation 335, the controller determines that the station cannot wake up within the next beacon slot in which the buffered multicast/broadcast frame is to be transmitted, and therefore the station will not be able to receive the multicast/broadcast frame, control then passes to operation 345 and the controller transforms the frame from a multicast/broadcast frame to a unicast frame. At operation 350 the controller holds the unicast frame until the target station is in an active state as per the TWT schedule negotiated between the access point and the target station. At operation 355 the controller may instruct the access point to transmit the unicast frame to the target station when the target station is in a wake time service period. Control then passes back to operation 325 and the iteration process continues with the next station.

Referring to operation 330, if the station is a ReceiveDTIMs enabled station then control passes to operation 340 and the controller determines whether the station can wake up before the beacon slot in which the buffered multicast/broadcast frame is to be transmitted (i.e., if NextTBTT(CurTime)<=$STA_{WAKE}(N)$<=$BCMC_{slot}$). If the station can wake up before the next beacon slot, it will parse the beacon with the indication of a buffered multicast/broadcast frame and will not enter into sleep mode until the subsequent $BCMC_{slot}$ is finished.

If, at operation 340 the controller determines that the station can wake up before the next beacon slot in which the buffered multicast/broadcast frame is to be transmitted, and therefore the station will be able to receive the multicast/broadcast frame, control passes back to operation 325 and the iteration continues with the next station. By contrast, if at operation 340, the controller determines that the station cannot wake up before the next beacon slot in which the buffered multicast/broadcast frame is to be transmitted, and therefore the station will not be able to receive the multicast/broadcast frame, control then passes to operation 345 and the controller transforms the frame from a multicast/broadcast frame to a unicast frame. At operation 350 the controller holds the unicast frame until the target station is in an active state as per the TWT schedule negotiated between the access point and the target station. At operation 355 the controller may instruct the access point to transmit the unicast frame to the target station when the target station is in a wake time service period. Control then passes back to operation 325 and the iteration process continues with the next station.

Thus, the iterative operations 325-350 depicted in FIG. 3 enable the controller to evaluate each station communicatively coupled to an access point to determine whether the station will be able to receive a multicast/broadcast frame that is transmitted in according to the DTIM for the access point. If a station will not be able to receive the multicast/broadcast frame, then the controller converts the multicast/broadcast frame to a unicast frame and holds the frame until the target station is in an active state. At operation 355 the controller may instruct the access point to transmit the unicast frame to the target station when the target station is in a wake time service period. FIG. 4 presents pseudocode 400 to implement various operations depicted in FIG. 3.

Figure 2B:
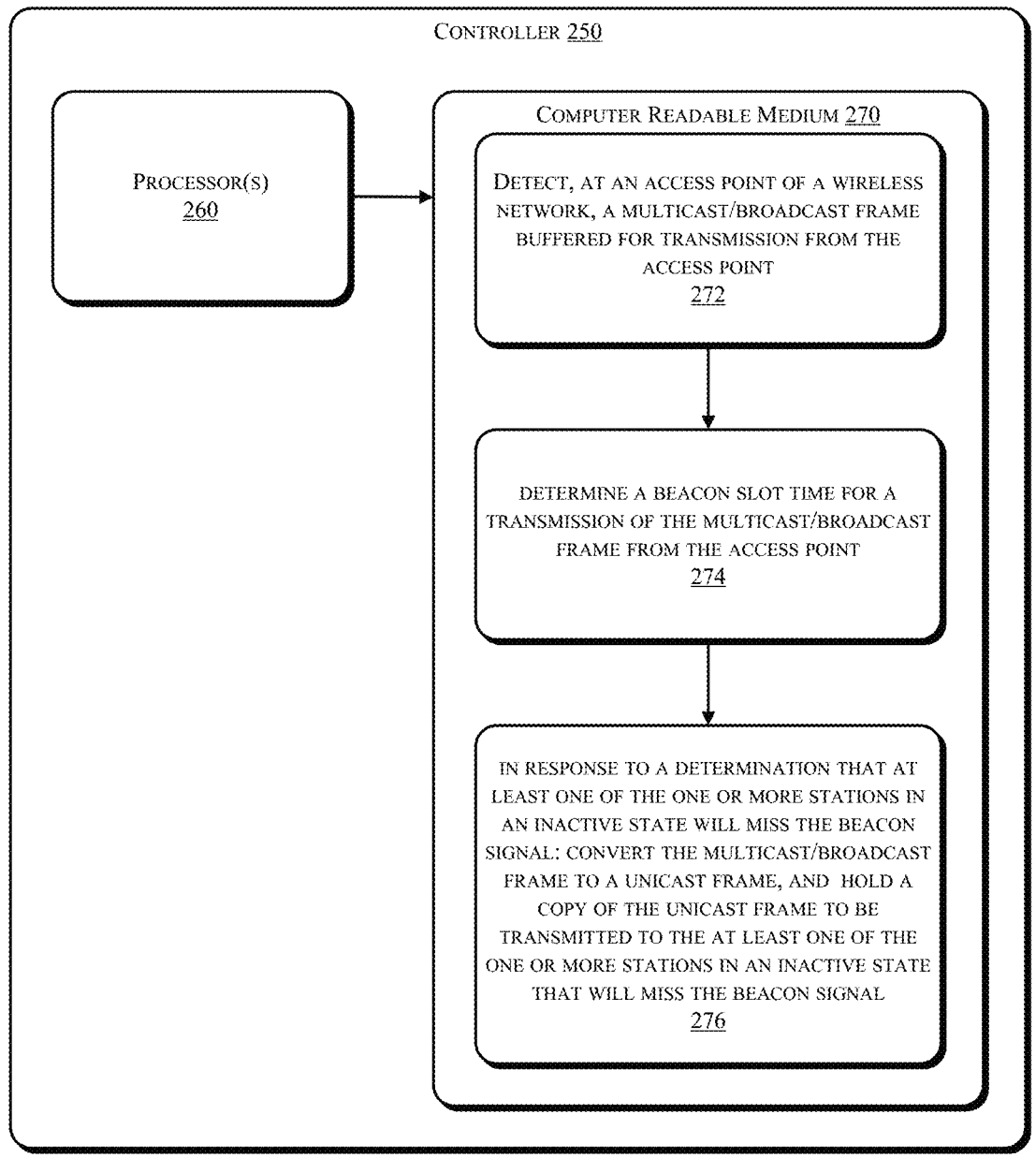
FIG. 2B is a schematic illustration of a controller comprising a processor and a non-transitory computer readable medium comprising instructions to implement a reliable multicast/broadcast transmission scheme in accordance with some embodiments

FIG. 2B is a schematic illustration of a controller 250 comprising one or more processors 260 and a non-transitory computer readable medium 270 comprising instructions to implement a method for scanning on a composite device in accordance with some embodiments. Processor 260 may be a central processing unit (CPU), microprocessor, and/or other hardware device suitable for retrieval and execution of instructions such as those stored in non-transitory computer readable medium 270. The non-transitory machine readable medium 270 may be any type of volatile or non-volatile memory or storage, such as random access memory (RAM), flash memory, read-only memory (ROM), storage volumes, a hard disk, or a combination thereof.

In various examples the medium 270 may store instructions 272 which may be executed by the processor(s) 260 to detect at an access point of a wireless network, a multicast/broadcast frame buffered for transmission from the access point, instructions 274 which may be executed by the processor(s) 260 to determine a beacon slot time for a transmission of the multicast/broadcast frame from the access point, and instructions 276 which may be executed by the processor(s) to, in response to a determination that at least one or more stations in an inactive state will miss the beacon signal the controller, convert the multicast/broadcast frame to a unicast frame and hold a copy of the unicast frame to be transmitted to the at least one of the one or more stations in an inactive state that will miss the beacon signal.

FIG. 5 is a schematic illustration of a timing diagram of a communication network which may be adapted to implement a reliable multicast/broadcast transmission scheme in accordance with some embodiments. In the example depicted in FIG. 4 an access point 140 operates with a DTIM of 3. As described above, when a multicast/broadcast frame is received the multicast/broadcast frame may be transmitted in the beacon slot 510 following the first DTIM after receipt of the frame. As illustrated in FIG. 4, there is overlap between the wake time 520 of station 2 154 and the broadcast beacon slot 510, so station 2 142 will be able to receive the multicast/broadcast frame that is transmitted in beacon slot 510. However, there is no overlap between the wake time 530 of station 1 152 or the wake time 540 of station 3 156 so these stations will not be able to receive the multicast/broadest frame that is transmitted in beacon slot 510. Accordingly, the controller will convert the multicast/broadcast frame to a unicast frame and hold the frame until such time as station 1 152 and station 3 156 are in an active state as per the TWT for those stations.

Figure 6:
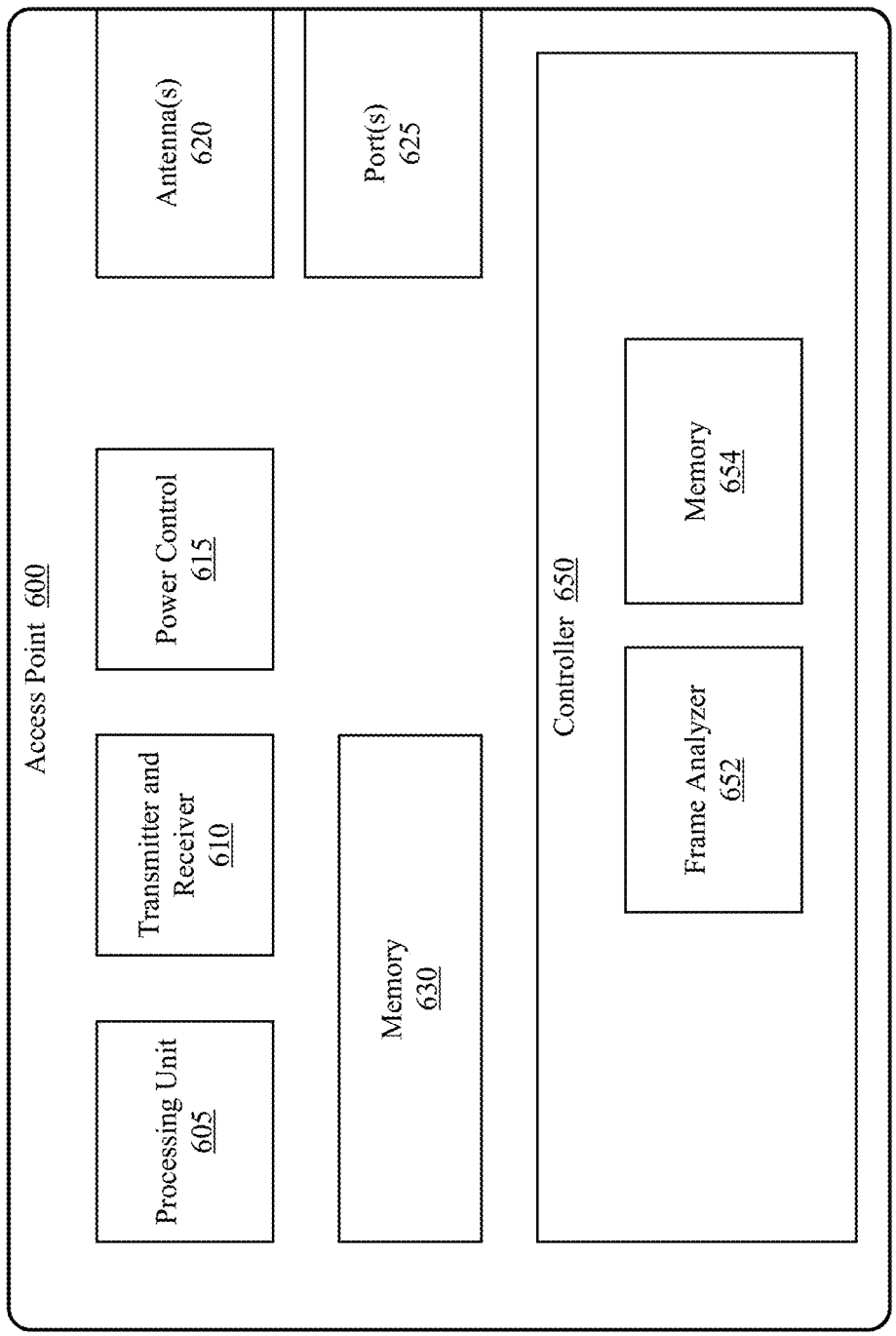
FIG. 6 is a schematic illustration of an access point for a wireless communication network in accordance with some embodiments.

FIG. 6 is block diagram to illustrate an access point which may be adapted to provide a reliable multicast/broadcast transmission scheme according to some embodiments. An access point may include additional components and elements not illustrated in FIG. 6, which is simplified for sake of illustration. The illustrated access point 600 may include an access point (such as an enterprise access point) operating under IEEE 802.11ac or 802.11ax standards, and may represent one of the access points 140, 145 depicted in FIG. 1.

In some embodiments, the access point 600 includes a processing unit 605, a transmitter and receiver 610, power control 615, one or more antennas 620 for wireless signal communication, and one or more ports 625 for network connections or other connections. The access point 600 may further include memory 630 for storage of data, which may include volatile and nonvolatile memory (including flash memory and similar elements), registers, and other storage technologies.

In some embodiments, the access point 600 further includes a controller 650 which may be implemented as hardware, firmware or as logic instructions which execute on a processor, or both combinations thereof. In some examples the controller includes a frame analyzer that implements the operations depicted in FIG. 2, and a memory 654 that may be used to store data associated with the operations depicted in FIG. 2.

Figure 7:
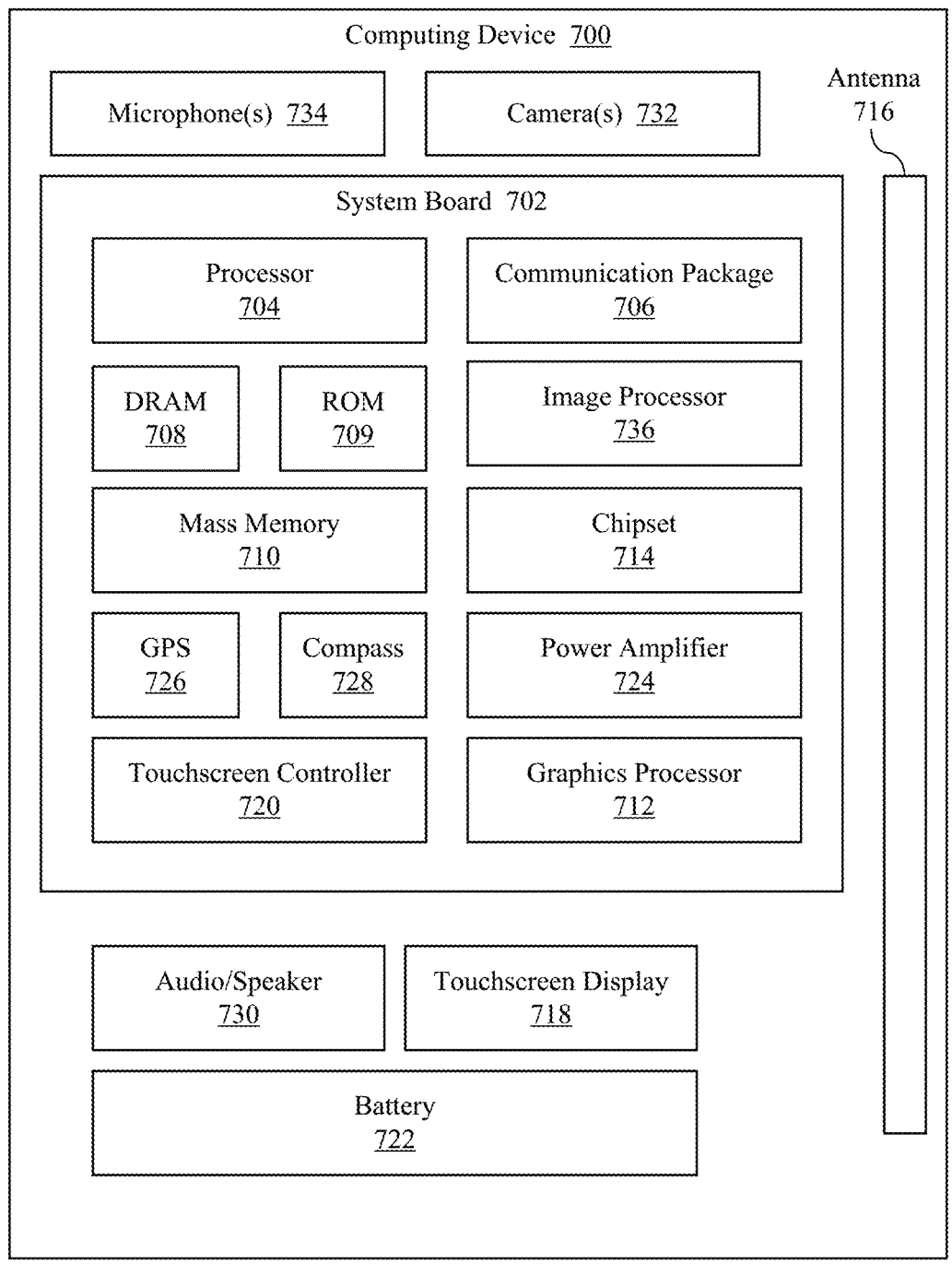
FIG. 7 is a schematic illustration of an access point for a wireless communication network in accordance with some embodiments.

FIG. 7 illustrates a computing device according to some embodiments. In some embodiments, the computing device may include a device to communicate with an access point in network. Computing device 700 houses a system board 702 (which may also be referred to as a motherboard, main circuit board, or other terms). The board 702 may include a number of components, including but not limited to a processor 704 and at least one communication package or chip 706. The communication package 706 is coupled to one or more antennas 716. The processor 704 is physically and electrically coupled to the board 702.

Depending on its applications, computing device 700 may include other components that may or may not be physically and electrically coupled to the board 702. These other components include, but are not limited to, volatile memory (e.g., DRAM) 708, nonvolatile memory (e.g., ROM) 709, flash memory (not shown), a graphics processor 712, a digital signal processor (not shown), a crypto processor (not shown), a chipset 714, an antenna 716, a display 718 such as a touchscreen display, a touchscreen controller 720, a battery 722, an audio codec (not shown), a video codec (not shown), a power amplifier 724, a global positioning system (GPS) device 726, a compass 728, an accelerometer (not shown), a gyroscope (not shown), a speaker or other audio element 730, one or more cameras 732, a microphone array 734, and a mass storage device (such as hard disk drive) 710, compact disk (CD) (not shown), digital versatile disk (DVD) (not shown), and so forth). These components may be connected to the system board 702, mounted to the system board, or combined with any of the other components.

The communication package 706 enables wireless and/or wired communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 706 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 700 may include a plurality of communication packages 706. For instance, a first communication package 706 may be dedicated to shorter range wireless communications such as Wi-Fi and Bluetooth and a second communication package 706 may be dedicated to longer range wireless communications such as GSM, EDGE, GPRS, CDMA, WiMAX, LTE, Ev-DO, and others.

In various implementations, the computing device 700 may be a laptop, a netbook, a notebook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 700 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
   a processor; and
   a memory communicatively coupled to the processor and comprising instructions which, when executed by the processor, configure the processor to perform operations, comprising:
   detecting, at an access point of a wireless network, a multicast/broadcast frame buffered for transmission from the access point;
   determining a beacon slot time for a transmission of the multicast/broadcast frame from the access point, wherein the beacon slot time is determined based at least in part on a Delivery Traffic Indicator Map (DTIM) parameter;
   determining that a first station of one or more stations is a ReceiveDTIM enabled station, wherein the first station is in an inactive state;
   in response to the determination that the first station is in the inactive state and will miss a beacon signal, scheduling a wake up slot time for the first station and the beacon slot time for the transmission of the multicast/broadcast frame, wherein the beacon slot time is before the wake up slot time;
   in response to a comparison that determined that the beacon slot time is before the wake up slot time:
   converting the multicast/broadcast frame to a unicast frame;
   holding a copy of the unicast frame to be transmitted to the first station in the inactive state that will miss the beacon signal; and
   during the wake up slot time, transmitting the unicast frame from the access point to the first station; and
   in response to (i) a determination that the first station is the ReceiveDTIM enabled station and (ii) the comparison that determined that the beacon slot time is after the wake up slot time associated with the first station, transmitting the multicast/broadcast frame to the first station during the beacon slot time.

2. The controller of claim 1, wherein the access point negotiates a target wake time schedule with the first station associated with the access point and stores the targeted wake time schedule in a computer-readable memory.

3. The controller of claim 1, further comprising instructions which, when executed by the processor, configure the processor to perform operations, comprising:
   transmitting the multicast/broadcast from the access point in the beacon slot time.

4. The controller of claim 1, wherein the unicast frame is transmitted during a target wake time service period for the first station.

5. A computer-implemented method, comprising:
 detecting, at an access point of a wireless network, a multicast/broadcast frame buffered for transmission from the access point;
 determining a beacon slot time for a transmission of the multicast/broadcast frame from the access point, wherein the beacon slot time is determined based at least in part on a Delivery Traffic Indicator Map (DTIM) parameter;
 determining that a first station of one or more stations is a ReceiveDTIM enabled station, wherein the first station is in an inactive state;
 in response to the determination that the first station is in the inactive state and will miss a beacon signal, comparing a wake up slot time scheduled for the first station and the beacon slot time for the transmission of the multicast/broadcast frame, wherein the beacon slot time is before the wake up slot time;
 in response to the comparison that determined that the beacon slot time is before the wake up slot time:
  converting the multicast/broadcast frame to a unicast frame;
  holding a copy of the unicast frame to be transmitted to the first station in the inactive state that will miss the beacon signal; and
  during the wake up slot time, transmitting the unicast frame from the access point to the first station; and
 in response to (i) a determination that the first station is the ReceiveDTIM enabled station and (ii) the comparison that determined that the beacon slot time is after the wake up slot time associated with the first station, transmitting the multicast/broadcast frame to the first station during the beacon slot time.

6. The computer-implemented method of claim 5, wherein the access point negotiates a target wake time schedule with the first station associated with the access point and stores the targeted wake time schedule in a computer-readable memory.

7. The computer-implemented method of claim 5, further comprising:
 transmitting the multicast/broadcast from the access point in the beacon slot time.

8. The computer-implemented method of claim 5, wherein the unicast frame is transmitted during a target wake time service period for the first station.

9. A non-transitory computer-readable medium comprising logic instructions which, when executed by a processor, configure the processor to perform operations comprising:
 detecting, at an access point of a wireless network, a multicast/broadcast frame buffered for transmission from the access point;
 determining a beacon slot time for a transmission of the multicast/broadcast frame from the access point, wherein the beacon slot time is determined based at least in part on a Delivery Traffic Indicator Map (DTIM) parameter;
 determining that a first station of one or more stations is a ReceiveDTIM enabled station, wherein the first station is in an inactive state;
 in response to the determination that the first station is in the inactive state and will miss a beacon signal, comparing a wake up slot time scheduled for the first station and the beacon slot time for the transmission of the multicast/broadcast frame, wherein the beacon slot time is before the wake up slot time;
 in response to the comparison that determined that the beacon slot time is before the wake up slot time:
  converting the multicast/broadcast frame to a unicast frame;
  holding a copy of the unicast frame to be transmitted to the first station in the inactive state that will miss the beacon signal; and
  during the wake up slot time, transmitting the unicast frame from the access point to the first station; and
 in response to (i) a determination that the first station is the ReceiveDTIM enabled station and (ii) the comparison that determined that the beacon slot time is after the wake up slot time associated with the first station, transmitting the multicast/broadcast frame to the first station during the beacon slot time.

10. The non-transitory computer-readable medium of claim 9, wherein the access point negotiates a target wake time schedule with the first station associated with the access point and stores the targeted wake time schedule in a computer-readable memory.

11. The non-transitory computer-readable medium of claim 9, further comprising logic instructions which, when executed by the processor, configure the processor to perform operations comprising:
 transmitting the multicast/broadcast from the access point in the beacon slot time.

12. The non-transitory computer-readable medium of claim 9, wherein the unicast frame is transmitted during a target wake time service period for the first station.

13. The non-transitory computer-readable medium of claim 9, further comprising logic instructions which, when executed by the processor, configure the processor to perform operations comprising:
 determining whether the first station communicatively coupled to the access point is able to receive the DTIM parameter.

14. The non-transitory computer-readable medium of claim 9, further comprising logic instructions which, when executed by the processor, configure the processor to perform operations comprising:
 determining whether the first station can wake up before the beacon signal is transmitted.

15. The controller of claim 1, further comprising:
 utilizing, at the access point, the DTIM parameter to inform other stations connected to the access point that multicast/broadcast data is buffered on the access point.

16. The controller of claim 1, further comprising instructions which, when executed by the processor, configure the processor to perform operations, comprising:
 broadcasting with a periodic beacon signal that specifies how frequently a beacon frame includes the DTIM parameter.

17. The controller of claim 1, further comprising instructions which, when executed by the processor, configure the processor to perform operations, comprising:
 at a second time, determining that the first station is in a low-power state and will miss the beacon signal; and
 scheduling a second wake up slot time for the first station.

18. The controller of claim 1, further comprising instructions which, when executed by the processor, configure the processor to perform operations, comprising:
 iterating for stations in power saving (PS) state; and
 based on the iterating, determining the one or more stations that are ReceiveDTIM enabled stations.

* * * * *